United States Patent [19] [11] Patent Number: 5,338,531
Chuang et al. [45] Date of Patent: Aug. 16, 1994

[54] PRODUCTION OF HYDROGEN PEROXIDE

[76] Inventors: Karl T. Chuang, 14717 - 45 Avenue, Edmonton, Alberta, Canada, T6H 5R4; Bing Zhou, #21, 10910 - 53 A Avenue, Edmonton, Alberta, Canada, T6H 0S3

[21] Appl. No.: 823,688

[22] Filed: Jan. 21, 1992

[51] Int. Cl.⁵ ............................................. C01B 15/01
[52] U.S. Cl. .................................. 423/584; 502/181; 502/229; 502/230
[58] Field of Search ................ 423/584; 502/229, 230, 502/181

[56] References Cited

U.S. PATENT DOCUMENTS

| | | |
|---|---|---|
| 4,009,252 | 2/1977 | Izumi et al. . |
| 4,661,337 | 4/1987 | Brill . |
| 4,681,751 | 7/1987 | Gosser . |
| 4,772,458 | 9/1988 | Gosser et al. . |
| 5,082,647 | 1/1992 | Chuang . |
| 5,116,592 | 5/1992 | Weinberg ............................ 502/181 |
| 5,132,099 | 7/1992 | Hiramatsu et al. .................. 423/584 |
| 5,135,731 | 8/1992 | Gosser et al. ....................... 423/584 |

FOREIGN PATENT DOCUMENTS

| | | |
|---|---|---|
| 132294 | 1/1985 | European Pat. Off. . |
| 366419 | 2/1990 | European Pat. Off. . |
| 0492064 | 8/1991 | European Pat. Off. . |

OTHER PUBLICATIONS

International Search Report mailed May 4, 1993 in PCT/CA93/00027.
Patent Abstracts of Japan, vol. 13, No. 384, C-629, abstract of JP, A, 1-33909 (Mitsuitoatsu Chem Inc.), May 26, 1989 (May 26, 1989).

*Primary Examiner*—Wayne Langel
*Attorney, Agent, or Firm*—Burns, Doane, Swecker & Mathis

[57] ABSTRACT

The invention relates to hydrogen peroxide manufacture, and catalyst therefor, by direct oxidation of hydrogen with oxygen in an acidic aqueous medium. The catalyst includes a Group VIII metal on a partially hydrophobic, partially hydrophilic support, such as Pd on fluorinated carbon. Improvements in $H_2O_2$ selectivity and catalyst stability are achieved by adding a source of sodium and chloride ions to the reaction medium and, in the case of a fluorinated carbon support, adding a source of fluoride ions.

10 Claims, No Drawings

PRODUCTION OF HYDROGEN PEROXIDE

FIELD OF THE INVENTION

This invention relates to a process for the production of hydrogen peroxide by direct catalytic oxidation of hydrogen with oxygen. The invention also relates to a catalyst for such process and a method for producing the catalyst.

BACKGROUND OF THE INVENTION

Hydrogen peroxide is commercially produced using a process known as the Riedl-Pfleiderer process. In accordance with this two step process, anthraquinone in a carrier solvent, termed "working solution", is cycled between an oxidation reactor and a hydrogenation reactor to convert hydrogen plus oxygen to hydrogen peroxide. Variations to the process have concentrated on the form of anthraquinone, the composition of the working solution and the type of catalyst used. A typical catalyst is palladium, raney nickel, or nickel boride on an inert support. The catalyst may be in the form of a slurry or a fixed bed. Hydrogen is needed at high partial pressures in this reaction posing the risk of explosion. The process is characterized as being complex and capital intensive.

Processes for the direct oxidation of hydrogen and oxygen to hydrogen peroxide offer the opportunity to develop a simpler, less costly process. Processes of this nature have been proposed, but to the inventors' knowledge have not been commercialized to date. The difficulties with the heretofore proposed processes include:
low concentrations of product
low selectivity (thus high hydrogen consumption)
low reaction rates
hazardous operating conditions (particularly hydrogen partial pressure requirements in the explosive range) and
high acid content.

Exemplary of such processes are the following patents, all of which include catalytic conversion of hydrogen with oxygen in an acidic aqueous medium:

U.S. Pat. No. 4,009,252 issued to Izu et al. reports good product concentrations (9-12% $H_2O_2$ by wt.) by operating at high acid concentrations (1 gpl HCl plus 49 gpl $H_2SO_4$) using Pd deposited on silicic acid, and oxygen to hydrogen molar ratios of 1.5 to 20, well into the explosive range for hydrogen. Selectivities for hydrogen to hydrogen peroxide were good with many examples in the range of from 80-89%. Reaction rates were generally low, ranging from less than 1 to just over 6 g of hydrogen peroxide per liter-hour.

U.S. Pat. No. 4,661,337 issued to Brill reports high concentrations of hydrogen peroxide and high reaction rates using Pd deposited on carbon in an aqueous solution containing 35 gpl HCl, by operating a stirred reactor in such a manner to keep the thickness of the aqueous slurry to 2 mm or less. For example, concentrations of 19.5% hydrogen peroxide were achieved at a rate of 48 g of hydrogen peroxide per liter-hour using hydrogen at 250 psi partial pressure and oxygen at 750 psi total pressure. However, much of the benefit of the higher reaction rates was lost since most of the reaction vessel was empty. Also, the reaction conditions were in the explosive range for hydrogen.

U.S. Pat. No. 4,772,458 issued to Gosser et al. (see also U.S. Pat. No. 4,681,751 and EPA 0132294 to Gosser et al.) achieved high concentrations and reaction rates with moderate selectivity at low acid levels (less than 2.5 gpl $H_2SO_4$) using Group VIII metals on a variety of carriers, but at hydrogen concentrations of 17% or higher, making the process hazardous. Selectivities tended to be low, ranging from 30% to 70%, provided bromide ions were present in the reaction medium. If chloride ions were used, very low selectivities of about 6% were achieved. The best results appear to have been achieved using a 1:10 ratio of Pt to Pd on an alumina carrier (1.10% total metal) with a hydrogen concentration of 17.8%. Hydrogen peroxide concentrations were 16.4% at 70% selectivity and the reaction rate was 52 g hydrogen peroxide per liter-hour.

There is a need for a direct oxidative process for the production of hydrogen peroxide which will produce hydrogen peroxide in good concentrations and at high selectivities and reaction rates, while allowing the process to be conducted at low acid levels and below the explosive range of hydrogen.

SUMMARY OF THE INVENTION

The present invention is based on a number of surprising discoveries made in investigating the direct catalytic oxidation of hydrogen with oxygen in an acidic aqueous medium using a catalyst comprising a Group VIII metal on a support. Firstly, the inventors discovered that the nature of the catalytic support used was important. Typically supports used in prior art processes were either strongly hydrophobic or strongly hydrophilic. The inventors discovered that a hydrophilic/hydrophobic balance in the catalyst support (and thus the resulting catalyst) was desirable. The catalyst (and catalyst support) must be partially hydrophobic so as to allow the gaseous reactants (hydrogen and oxygen) to contact the catalyst surface. However, the catalyst (and catalyst support) must also be partially hydrophilic, or partially wettable, so as to allow the hydrogen peroxide formed at the catalyst surface to be diffused into the liquid phase. If the hydrogen peroxide remains associated with the catalyst surface for a period of time water is formed.

The inventors have found that this hydrophobic/hydrophilic balance is preferably achieved using a fluorinated carbon support or a partially wettable Vulcan carbon support. The level of fluorination is preferably in the range of 10-65% F, more preferably 20-50% F.

A second surprising discovery was that the selectivity of the reaction for hydrogen peroxide could be increased with the addition of a source of sodium and chloride ion. This can be achieved in the catalyst preparation stage, as will be described hereinafter, or by adding a source of these ions to the acidic aqueous reaction medium. In fact since these soluble ions are constantly removed with the aqueous reaction medium during the process, a supply of these ions to the aqueous medium is preferable throughout the process or at least once a decline in catalytic activity is noticed. The most economical source of these ions is in the form of NaCl. Amounts in range of 3 to 30 wt % based on catalyst are desired.

The inventors noticed that the catalytic activity of their preferred catalyst (Pd on a fluorinated carbon support) declined with use. Having discovered the level of fluorination to be important to the catalyst, the inventors tried adding a source of fluoride ions to the aqueous medium. This led to an important third discovery, that a source of fluoride ions in the aqueous medium stabilized the catalyst against decline in catalytic activity. A convenient source of fluoride ions is NaF, which can be included in amounts of 2 to 10 wt % based on catalyst.

In producing a supported catalyst, the inventors made a fourth important discovery. The inventors found that it was preferable to slurry together the Group VIII metal (preferably Pd) with sodium citrate in a solution such as water. It is believed that this forms a Pd-sodium citrate complex or colloid with two important consequences. When the catalyst support is impregnated with the Pd-sodium citrate complex, the metal is strongly held to the support and well distributed on the support surface. In the preferred embodiment of the invention, this method of catalyst preparation also provides the desired sodium and chloride ions in the catalyst, the sodium being supplied from the sodium citrate and the chloride from the chloride salt of the Group VIII metal (for example $PdCl_2$) which is initially slurried with the sodium citrate.

The combination of the above-described discoveries have resulted in a process for the production of hydrogen peroxide which can be conducted with good concentrations of $H_2O_2$ (5-6%), at high selectivities (up to 100%) and good reaction rate (5-11 gpl-hr $H_2O_2$), while allowing one to operate at hydrogen pressures below the explosive limit and moderate acidities (for example 6 gpl $H_2SO_4$).

Broadly stated, the invention provides a process for producing hydrogen peroxide by direct oxidation of hydrogen with oxygen in an acidic aqueous medium, comprising:

(a) contacting the hydrogen and oxygen containing acidic aqueous medium with a catalyst consisting of at least one Group VIII metal on a partially hydrophobic, partially hydrophilic support in a pressure vessel;

(b) providing a source of sodium and chloride ions to the acidic aqueous medium either at the outset of the reaction or once there is a decline in catalytic activity;

(c) maintaining the pressure in the vessel in the range of 3.5 MPa-20 MPa, with a hydrogen partial pressure below the explosive limit; and (d) maintaining the temperature in the range of the freezing point of the aqueous medium to about 60° C.

In another aspect, the invention broadly provides a catalyst for use in the production of hydrogen peroxide, comprising:

a) a partially hydrophobic, partially hydrophilic support, preferably vulcan carbon or fluorinated carbon with a 10-65% F content;

(b) a Group VIII metal; and (c) a source of sodium and chloride ions.

In yet another broad aspect of the invention, there is provided a method of producing a catalyst for the production of hydrogen peroxide, comprising:

(a) providing sodium citrate and a Group VIII metal salt in an aqueous solution;

(b) heating the solution to form a Group VIII—sodium citrate colloid;

(c) adding a catalyst support to the colloid containing solution;

(d) evaporating the solution from the solid; and (e) reducing the resulting solid in a hydrogen atmosphere.

DESCRIPTION OF THE PREFERRED EMBODIMENTS

A Group VIII metal is used in a catalytically effective amount in the catalyst of this invention. While such metals as Pt, Ru, Rh, Ir are catalytically active for the production of hydrogen peroxide, Pd is the preferred metal. Mixtures of Group VIII metals may also be used. The metal is generally provided in the form of salt, preferably a chloride salt such as $PdCl_2$.

The Group VIII metal is employed in the form of a supported catalyst, the catalyst support being partially hydrophobic and partially hydrophillic, as described hereinafter.

The support should have a surface area in the range of 50 $m^2/g$ to 1500 $m^2/g$. A surface area of about 130 $m^2/g$ has been found to be suitable. Preferably, the support is used as discrete particles or granules (particle size less than 1 micrometer being suitable), but it may also be deposited on other support material such as ceramic beads or rings, as is known in the art.

As previously set forth, the catalyst support (and the resulting catalyst) should have a hydrophobic/hydrophilic balance which allows the gaseous reactants ($H_2+O_2$) to reach the catalyst surface (in aqueous medium) while allowing the formed $H_2O_2$ to be released into the aqueous medium. Strongly hydrophobic catalyst supports as are known in the art, are not suitable. Hydrophobicity is often defined by the "contact angle" according to Young's Theory. A catalyst support having a contact angle of 90° is typically accepted as being a hydrophobic catalyst support. Catalyst supports in accordance with the present inventions will have a contact angle less than 90°.

Two preferred catalyst supports in accordance with this invention are partially wettable prefluorinated carbon and Vulcan carbon. In respect of the former material, the level of fluorination affects the hydrophobic/hydrophilic nature of the catalysts. A level of fluorination of 10-65% F is preferred. A level of fluorination of 20-50% F is more preferred with 28% F being found to be sufficient. Partially wettable Vulcan carbon is a specially treated activated carbon available from Cabot, U.S.A.

The catalyst is preferably made by first preparing a complex or colloid of the Group VIII metal with sodium citrate. This provides a stronger attachment of the metal to the catalyst support and better disperses the metal on the catalyst surface. To that end, sodium citrate and the Group VIII metal are slurried in a solution such as water and heated to form the colloid. Heating should be at the boiling point for at least 6 hours and preferably 10 hours. The amount of Group VIII metal used should be sufficient to provide about 0.1-10% wt in the final catalyst. In respect of Pd, an amount of 0.7% wt in the catalyst is sufficient.

The catalyst support is impregnated with the metal-colloid solution. Preferably a reagent is added to the catalyst support metal-colloid slurry to lower the density of the slurry and decrease the tendency of the catalyst support to float at the surface. Methanol is suitable for this purpose. After slurrying, the solution is evaporated and the catalyst is reduced in a hydrogen atmosphere (preferably 14 hours at 300° C.).

In accordance with the preferred embodiment described above, the catalyst inherently contains the desired sodium chloride ions found to improve subsequent $H_2O_2$ production. The sodium is provided by the sodium citrate while the chloride is provided from the $PdCl_2$ salt. When prepared in this manner, the catalyst can initially be used without adding NaCl to the reaction medium.

Production of Hydrogen Peroxide

The process for producing hydrogen peroxide is preferably performed in a stirred, pressure reactor such as a flow slurry autoclave, at temperatures between the freezing point of the liquid medium and about 60° C., preferably 0°–25° C. As the reaction is highly exothermic, cooling to these temperature is generally needed.

The reactor is preferably charged with the catalyst and the additives (NaCl and NaP, if desirable) prior to adding the acidic aqueous solution. As previously indicated, these additives may be added later during the reaction, once the catalyst activity begins to decline. The additive NaCl is preferably added in an amount of 3–30 wt % (based on catalyst) and the NaF additive is preferably added in an amount of 2–5 wt % (based on catalyst).

The acidic solution is preferably a mild acidic solution. An $H_2SO_4$ solution is economical. An acid strength of 0.5–1.0 % w/w $H_2SO_4$ is suitable. Higher acid strengths have not been found to improve the process.

Oxygen and hydrogen gas are then charged to the reactor. A major advantage of the process of this invention is that it can be carried out at a hydrogen partial pressure below the explosive limit. This limit is understood to be the highest percent hydrogen in the reaction atmosphere which will indicate an explosive range as measured by a standard MSA explosimeter. Typically a $H_2$ partial pressure below about 4 volume percent is used. The total pressure in the reactor will be in the range of 500 psig (3.5 MPa) to 3000 psig (20 MPa), the preferred range being 1000 psig (6.7 MPa) to 1500 psig (10 MPa). Oxygen may be supplied in a pure form or, more preferably, in combination with nitrogen. Oxygen contents as low as air may be used. A preferred gas feed to the reactor consists of 3.2% $H_2$, 10% $N_2$ and 86.8% $O_2$.

The reaction may be performed on a continuous or batch basis. Since the NaCl and NaP additives are water soluble, these additives should be added on a continuous basis as they are washed out of the system.

This invention is further illustrated in the following examples:

PREPARATION OF CATALYST

Example 1

Sodium citrate (8.07 g) was dissolved in 807 ml of water, to which was added 56 ml of $6.7 \times 10^{31}$ 3 M $PdCl_2$. This mixture was further diluted with 403 ml of water. The mixture was heated to boiling for 10 hours to form a Pd-sodium citrate colloid solution. To this was added 2 g fluorinated carbon (fluorine content 28%, median particle size less than one micrometer, surface area 130 m$^2$/g) together with 100 ml methanol. The solution was evaporated and the solid was reduced in hydrogen for 14 hours at 300° C. The resultant catalyst contained approximately 0.7% Pd. The catalyst was a partially wettable, black, slightly sticky powder.

Example 2

Further catalysts were prepared in accordance with the procedure set out in Example 1, with fluorinated carbon supports similar in all other respects, but having 10% and 65% F content respectively.

Example 3

A further catalyst was prepared in accordance with the procedure set out in Example 1, but using a partially wettable vulcan Carbon support available from Cabot, U.S.A. (Vulcan 9 A32 CS-329).

PRODUCTION OF HYDROGEN PEROXIDE

Example 4

A stirred, 450 ml flow slurry autoclave was charged as follows:

0.3 g catalyst (Example 1)
0.03 g NaCl
50 ml 0.6% w/w $H_2SO_4$

The autoclave was put in a cold bath maintained at 0° C. The hydrogen and oxygen gas were introduced into the autoclave and the pressure was increased to 1000 psig with a total gas flow rate of 300 ml/min (3.2% vol $H_2$, 10% $N_2$ and 86.8% $O_2$), with vigorous mixing. Product conversion and selectivity after 1, 3, 6 and 10 hours were analyzed. The gas phase was analyzed by on-line gas chromatography with a thermal conductivity detector. Argon was used as a carrier gas for analysis. The $H_2$, $N_2$ and $O_2$ in the gas feed were separated by a $10' \times \frac{1}{8}''$ diameter stainless steel column packed with 80–100 mesh Porapak QS.

The liquid product was titrated by potassium permanganate to quantitatively determine the $H_2O_2$ formed. The equation for the titration is:

$$5H_2O_2 + 2KMnO_4 + 3H_2SO_4 \rightarrow 2MnSO_4 + K_2SO_4 + 8H_2O + 5O_2$$

The $H_2O_2$ concentration was measured directly by titration and confirmed by U.V. spectroscopy. The $H_2$ conversion was calculated as a ratio of $$\frac{H_2 \text{ content initial} - H_2 \text{ content measured}}{H_2 \text{ content initial}}$$

The $H_2O_2$ selectivity was calculated on the basis that, if all the $H_2$ reacted was converted to $H_2O_2$, the selectivity would be 100%, thus $$H_2O_2 \text{ selectivity} = \frac{H_2O_2 \text{ measured}}{H_2O_2 \text{ calculated}} \times 100,$$

where

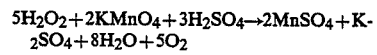

where

F = flow of the gas
t = reaction time

The results are summarized in Table 1

TABLE 1

| Reaction Time | $H_2O_2$ conc, % w/w | $H_2$ conv, % | $H_2O_2$ Selectivity % |
| --- | --- | --- | --- |
| 1 hr | 1.1 | 70 | 84 |
| 3 hr | 2.3 | 61 | 73 |
| 6 hr | 3.8 | 58 | 63 |
| 10 hr | 5.4 | 52 | 59 |

Example 5

This example is included to show the results of $H_2O_2$ production without the NaCl additive. The catalyst obtained after several runs in accordance with Example 4 was thoroughly washed and filtered to remove NaCl. When the washed catalyst was thereafter used in $H_2O_2$ production (same conditions as Example 4, no added NaCl) the results after 10 hours were 1.32% w/w $H_2O_2$, $H_2$ conversion 25.5%, $H_2O_2$ selectivity 30%.

Example 6

The stabilizing effect of NaP is illustrated in this example. The procedure for producing $H_2O_2$ set forth in Example 4 was repeated. Without the addition of NaP, after 8 days reaction, the $H_2$ conversion had dropped to 33%. When NaF was added to the aqueous medium in an amount of 0.01 g. the $H_2$ conversion after 8 days was 44%.

Example 7

The importance of the hydrophobic/hydrophillic balance in the catalyst support is ,illustrated in this example. The catalysts of Example 2 (10% and 65% F content) were subjected to reaction conditions similar to Example 4 with the following results after 10 hours.

TABLE 2

| % F | $H_2O_2$ conv, % w/w | $H_2$ conv, % | $H_2O_2$ Selectivity % |
|---|---|---|---|
| 10% F | 2.1 | 25 | 66 |
| 65% F | 2.2 | 31 | 38 |

Example 8

This example illustrates the effect of varying the amount of NaCl added to the reaction medium. The catalyst of Example 1 (0.7% w/w Pd on fluorinated carbon support) was reacted under conditions similar to Example 4 (0.3 g catalyst, 50 ml 1% w/w $H_2SO_4$, varying amounts of NaCl, 3.2% $H_2$, 10.0% $N_2$ balanced by $O_2$, 0° C., 1000 psig, 300 ml/min gas, 10 h reaction time). The results are summarized in Table 3.

TABLE 3

| NaCl(g) | $H_2O_2$ conc, % w/w | $H_2$ conv, % | $H_2O_2$ Selectivity, % |
|---|---|---|---|
| 0.0117 | 5.83 | 61 | 53 |
| 0.0306 | 5.83 | 53 | 60 |
| 0.0500 | 5.86 | 53 | 61 |
| 0.1008 | 5.79 | 48 | 69 |

Example 9

This example illustrates the effect of varying the amount of NaP added to the reaction medium. The procedure of Example 4 was repeated, but with 0.0261 g NaCl and 0.0054 g NaP. After 6 hours, 4.0% w/w $H_2O_2$ obtained $H_2$ conversion was 61% and $H_2O_2$ selectivity was 63%. This procedure was repeated with 0.0328 g NaCl and 0.0078 g NaF. After 6 hours, 3.32% w/w $H_2O_2$ was obtained, $H_2$ conversion was 58% and $H_2O_2$ selectivity was 60%. This procedure was repeated with 0.03 g NaCl and 0.0290 g NaF. After 10 hours, the $H_2O_2$ concentration was 2.16% w/w, $H_2$ conversion was 52% and $H_2O_2$ selectivity was 23.6%.

Example 10

This example demonstrates that NaBr and KBr do not provide similar benefits to the NaCl or NaF additives of this invention. The procedure of Example 4 was repeated using 0.0361 g KBr in place of NaCl (acid solution was 1% w/w $H_2SO_4$). After 10 hours, 1.1% w/w $H_2O_2$ was obtained, $H_2$ conversion was about 4% and $H_2O_2$ selectivity was estimated at 100%. This procedure was repeated with 0.0308 g NaBr in place of NaCl. After 10 hours reaction, 1.1% w/w $H_2O_2$ was obtained, $H_2$ conversion was about 3% (below the detection limit of GC) and $H_2O_2$ selectivity was estimated at about 100%.

Example 11

The example illustrates $H_2O_2$ production with an alternate catalyst support, partially wettable Vulcan carbon. The catalyst of Example 3 was reacted under the conditions of Example 4 with the results of Table 4.

TABLE 4

| Reaction Time | $H_2O_2$ conc, % w/w | $H_2$ conv, % | $H_2O_2$ Selectivity, % |
|---|---|---|---|
| 1 hr | 1.6 | 91 | 99 |
| 3 hr | 4.3 | 61 | 100 |
| 6 hr | 5.8 | 55 | 95 |
| 10 hr | 6.5 | 55 | 64 |

We claim:

1. A process for producing hydrogen peroxide by direct oxidation of hydrogen with oxygen in an acidic aqueous medium, comprising:
   (a) contacting said hydrogen and oxygen containing acidic aqueous medium with a catalyst consisting of at least one Group VIII metal on a partially hydrophobic, partially hydrophilic support in a pressure vessel;
   (b) providing a source of sodium and chloride ions to the acidic aqueous medium either at the outset of the reaction or once there is a decline in catalytic activity;
   (c) maintaining the pressure in the vessel in the range of 3.5 MPa–20 MPa, with a hydrogen partial pressure below the explosive limit; and
   (d) maintaining the temperature in the range of the freezing point of the aqueous medium to about 60° C.;
   wherein the catalyst support is fluorinated carbon with a level of fluorination such that it is partially hydrophobic to allow the gaseous reactants to contact the catalyst, while being partially hydrophilic to diffuse the formed hydrogen peroxide from the catalyst to the aqueous medium; and wherein the level of fluorination is in the range of about 10 to 65% F.

2. The process as set forth in claim 1, wherein the level of fluorination is in the range of about 20 to 50% F.

3. The process as set forth in claim 1, wherein the level of fluorination is about 28% F.

4. The process as set forth in claim 1, wherein the Group VIII metal is Pd.

5. The process as set forth in claim 2, wherein the Group VIII metal is Pd.

6. The process as set forth in claim 1, wherein sodium, chloride and fluoride ions are provided to the aqueous medium in the form of NaCl and NaF.

7. The process as set forth in claim 5, wherein sodium, chloride and fluoride ions are provided to the aqueous medium in the form of NaCl and NaF.

8. The process as set forth in claim 7, wherein NaCl is provided in the range of about 3–30 wt %, based on catalyst and NaF is provided in the range of about 2–10 wt %, based on catalyst.

9. The process as set forth in claim 1, wherein the catalyst support is partially wettable Vulcan carbon.

10. The process as set forth in claim 1, wherein the aqueous medium is agitated to prevent the catalyst from floating at the surface.

* * * * *